United States Patent [19]

Goward et al.

[11] 3,838,592
[45] Oct. 1, 1974

[54] HOSE END FITTINGS AND INSERTS THEREFOR

[75] Inventors: Stanley Harold Goward, Odd Stock; Anthony Yorath, Salisbury, both of England

[73] Assignee: BTR Industries Limited, London, Great Britain

[22] Filed: Nov. 17, 1972

[21] Appl. No.: 307,522

[30] Foreign Application Priority Data
Feb. 2, 1972  Great Britain...................... 4997/72

[52] U.S. Cl..................... 72/318, 72/356, 285/256
[51] Int. Cl............................................ B21d 41/00
[58] Field of Search ............... 72/318, 356; 285/256

[56] References Cited
UNITED STATES PATENTS

| | | | |
|---|---|---|---|
| 381,355 | 4/1888 | Firth et al............................ | 72/356 |
| 1,791,887 | 2/1931 | Davies et al........................ | 72/318 |
| 3,549,180 | 12/1970 | MacWilliam....................... | 285/256 |
| 3,698,745 | 10/1972 | Mundt................................ | 285/256 |

FOREIGN PATENTS OR APPLICATIONS

363,574  12/1931  Great Britain...................... 72/370

Primary Examiner—Lowell A. Larson

[57] ABSTRACT

The specification discloses a method of manufacturing an insert for an end fitting from a length of tubular material, the insert having a B.S.P. nipple or like nipple on the end thereof, comprising the steps of forming, by means of a first punch which is inserted within the tube and co-operates with a first die located around the length adjacent one end of the tube, an enlargement of the bore of the tube at the one end thereof and an external annular abutment facing axially away from the one end where the enlargement joins the tube, and then forming the enlargement at the one end to provide the required external sealing face of the nipple. There is also disclosed a hose end fitting comprising an insert made by this method combined with a ferrule surrounding at least part of the insert and defining with the other end thereof an annular space for receiving an end portion of a hose, the end of the ferrule remote from the other end of the insert being swaged inwardly to engage the insert and hold the ferrule against relative axial movement with respect to the insert.

3 Claims, 10 Drawing Figures

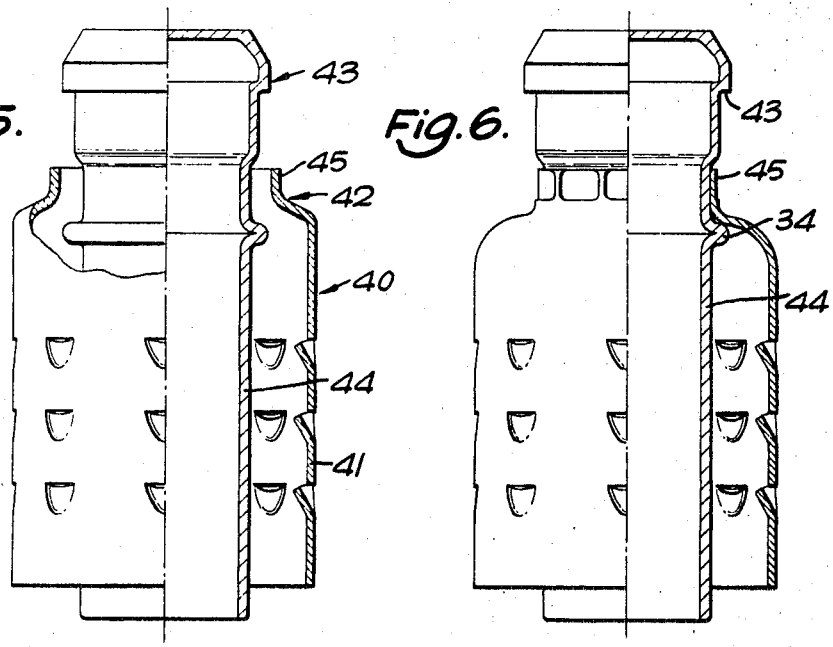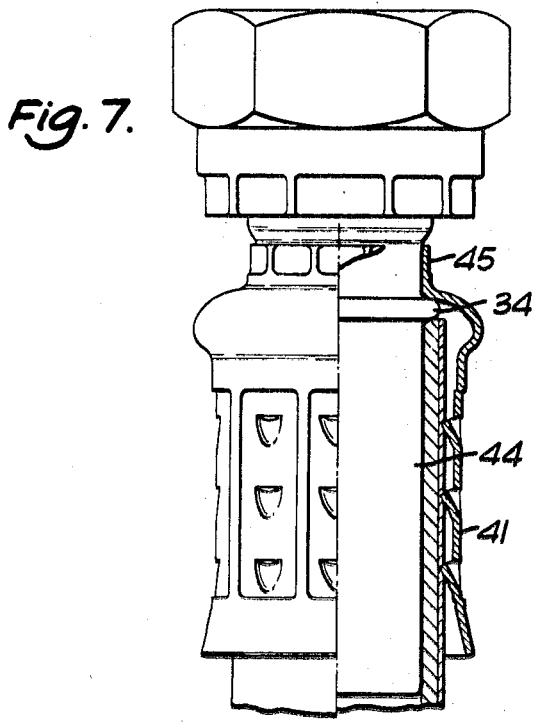

1

HOSE END FITTINGS AND INSERTS THEREFOR

BACKGROUND OF THE INVENTION

The invention relates to hose end fittings and to inserts therefor, and in particular to inserts having a B.S.P. nipple or a like nipple on the end thereof, so that the hose end fitting may be attached to a union or other connecting piece having a corresponding form. The shape and dimensions of B.S.P. nipples are well known in the hose end fitting art, and vary in dependence upon the diameter of the end fitting. Like nipples may comprise for example a nipple having a part-spherical sealing face in place of the frusto-conical sealing face of a B.S.P. nipple, or having an outwardly flared sealing face.

It is known to machine inserts for reinforced hose from bar material. The jointing nipple is usually machined as an integral part of the insert or, in some circumstances, as a separate item which is then brazed or welded to the part which is inserted into the hose. It is also known to provide a machined shoulder to ensure that there is no relative axial movement between the insert and the ferrule during use.

The object of the invention is to provide a method of producing a hose insert completely by forming from tube or sheet, with or without subsequent metal machining, to provide a nipple head. A further object is to form the insert from tube or sheet and to also provide a means of retaining the ferrule.

SUMMARY OF THE INVENTION

The invention provides a method of manufacturing an insert for an end fitting from a length of tubular material, the insert having a B.S.P. nipple or like nipple on the end thereof, comprising the steps of forming by means of a first punch which is inserted within the tube and co-operates with a first die located around the length adjacent one end of the tube an enlargement of the bore of the tube at the one end thereof so that there is an external annular abutment facing axially away from the one end where the enlargement joins the tube, and then forming the enlargement at the one end to provide the required external sealing face.

The forming of the enlargement may be effected in two steps by means of a second die to form partially the sealing face, and then by means of a third die to form fully the sealing face with the required internal and external diameters.

The punch used to enlarge the one end of the length may support the one end against collapse during forming by the second die.

An outwardly directed circumferential rib may be formed around the length part way between the ends thereof, by expanding the walls of the tube into a recess in the first or a further die by endwise pressure on the length, the bore of the tube being supported against collapse by a mandrel inserted therein.

The rib may be formed prior to the enlargement of the one end, the rib being used to hold the length against axial movement during subsequent steps.

In any of the above described methods the bore of the one end may be supported against collapse during forming by the second die, and during forming by the third die.

The invention further provides a hose end fitting comprising an insert having a B.S.P. nipple or like nipple on the end thereof whenever formed by any one of the above-described methods, in combination with a ferrule surrounding at least part of the insert and defining with the other end thereof an annular space for receiving an end portion of a hose, the end of the ferrule remote from the other end of the insert being swaged inwardly to engage the insert and hold the ferrule against relative axial movement with respect to the insert.

The ferrule may be formed with a first cylindrical portion for swaging into engagement with a hose end portion located in said annular space, and a second cylindrical portion for swaging into contact with said part of the insert.

The one end of the ferrule may be swaged into contact with a part of the insert adjacent the B.S.P. nipple or like nipple, and preferably between the abutment and the rib.

In any of the above arrangements of end fitting, the ferrule may comprise a ferrule having a portion for swaging into contact with a hose end portion which portion is provided with a plurality of inwardly directed barbs, as described in our pending British Pat. application No. 48173/71.

BRIEF DESCRIPTION OF DRAWINGS

FIG. 5 shows an insert with a ferrule before swaging;

FIG. 6 shows the insert with a ferrule after initial swaging; and

FIG. 7 shows the insert with a ferrule fitted to a hose after final swaging.

DESCRIPTION

Figure 1:
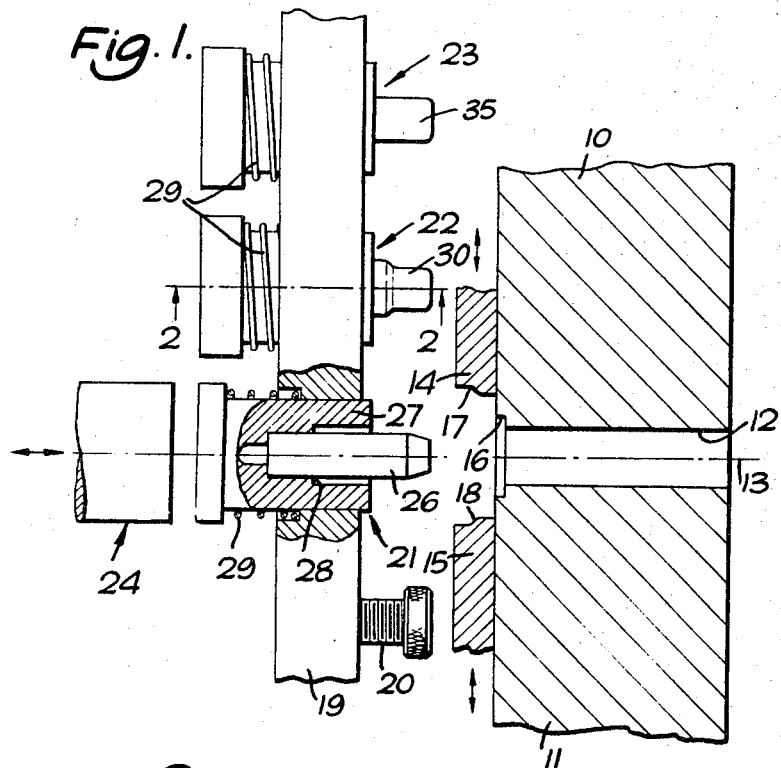
FIG. 1 shows an apparatus for manufacturing an insert for a hose end fitting.
Figure 2:
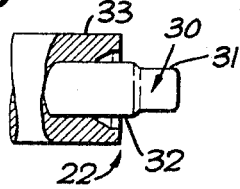
FIGS. 2 and 3 are sectional views of parts of the apparatus of FIG. 1.
Figure 3:
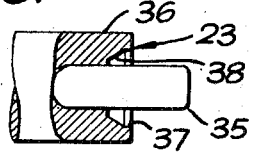

Referring to FIGS. 1 to 3, an apparatus is shown for manufacturing a hose end fitting insert having a B.S.P. nipple on one end thereof from a piece of tubular stock in three deforming operations. The apparatus comprises a pair of clamping jaws 10 and 11 which together define a bore 12, the jaws being split in a plane passing through the axis 13 of the bore. A pair of forming jaws 14 and 15 are mounted on the jaws 10 and 11 respectively for sliding movement towards and away from the axis 13. The bore 12 defined by the clamping jaws 10 and 11 has a counter bore 16 at the end thereof adjacent the forming jaws and the forming jaws are movable to and from a position (not shown) in which their inner surfaces 17 and 18 together define a bore coaxial with and of equal diameter to the bore 12, a tapered shoulder joining the bore to an enlarged counter bore remote from the clamping jaws.

A tool carrier 19 is mounted for movement in front of the forming jaws such that tools 20 to 23 may be successively brought into line with the bore 12. A ram 24 is mounted coaxial with the bore 12 to impart movement to the tools 21 to 23 towards the bore 12. Each tool is provided with a spring 29 to return it to the position shown after being moved to the right (in the drawing) by the ram 24.

The tool 20 serves as an end-stop for locating initially a piece of tubular stock within the clamping jaws 10 and 11, and each of the tools 21 to 23 comprise an internal punch and external die for effecting forming of the stock, as described below. It will be appreciated that each combination punch and die tool may be formed as a single tool, or the punch and the die may be formed separately and assembled together to provide the combination tool.

Figure 4A:
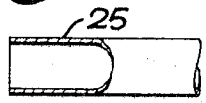
FIGS. 4a and 4d show the steps in deforming a tube to manufacture an insert.

In order to form a hose insert, the apparatus is used as follows:

A length of tubular stock 25 (FIG. 4a) is cut to length and is located between the separated clamping jaws 10 and 11, the tool carrier 19 being positioned so that the end-stop 20 is aligned with the bore 12. The left-hand end (in the drawing) of the stock is engaged with the end-stop 20 and the clamping jaws closed (as shown in FIG. 1) to hold the stock against movement.

Figure 4B:
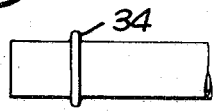

The tool carrier 19 is then moved so that the punch and die combination tool 21 is aligned with the stock, and the ram 24 operated to force the tool 20 into engagement with the stock. The tool 21 comprises a punch 26 which serves to support the bore of the stock 25 against collapse and a cylindrical sleeve 27, which, with the punch 26 defines an annular recess into which an end portion of the stock fits. The tool 21 is forced axially so that the end of the stock engages the end wall 28 of the sleeve 27, whereafter further endwise pressure expands the wall of the stock into the counter bore 16 to form a rib 34 as shown in FIG. 4b. The ram is then withdrawn, and the spring 29 withdraws the tool 21 from the stock.

Figure 4C:
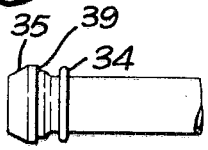

The tool carrier 19 is moved to align the punch and die combination tool 22 with the axis 13, and the forming jaws 14 and 15 are moved to surround the stock. The tool 22 comprises a stepped punch 30 which has a first diameter portion 31 to enlarge the end of the stock into the counter bore in the forming jaws, and a second diameter portion 32 to enlarge part of the enlarged end portion of the stork yet further. After enlargement by the punch 30, the internal surface of the die 33 engages the enlarged outer surface of the end portion and forms partially a conical sealing surface 34 tapering inwardly towards the end of the stock, as shown in FIG. 4c. The ram and tool 22 are then withdrawn from the end of the stock. The aforementioned tapered shoulder in the surfaces 17 and 18 of the forming jaws forms a corresponding step in the wall of the stock, and the faces of the forming jaws opposed to the faces engaging the clamping jaws 10 and 11 form, in combination with the punch portion 32, a shoulder 32 on the insert. The shoulder serves as an annular abutment facing away from the end against which an end fitting nut bears when the end fitting is completed.

Figure 4D:
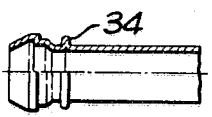

The tool carrier 19 is then moved to align the punch and die combination tool 23 with the axis 13, and the ram 24 is operated to force the tool 23 into engagement with the end portion of the stock to form fully the conical sealing face of the hose end fitting insert. The tool 23 comprises a punch 35, the diameter of which is substantially equal to the internal diameter of the stock, and a die 36 having a bore 37 of constant cross section adjoining a conical forming surface 38. The punch serves to support the part-formed end portion of the insert against collapse as the die forms fully the conical sealing face at the required angle and internal and external diameters for the B.S.P. nipple on the insert. The fully formed insert is shown, partly in section, in FIG. 4d.

It will be appreciated that the tool carrier may be of circular form rotatably mounted about an axis parallel to axis 13 so that each tool 20 to 23 may successively be aligned with the stock.

The shoulder 39 together with the adjoining cylindrical portion and the conical sealing face at the required angle and internal and external diameters form the B.S.P. nipple. The actual dimensions of a B.S.P. nipple vary in dependence on the diameter of the insert.

The hose end fitting insert may be used in combination with known ferrules of the kind which are swaged or crimped to clamp an end portion of a hose between the outer wall of the insert, and the inner wall of the ferrule. The insert may also be used with ferrules similar to that described in our copending Patent application No. 48173/71, in which the ferrules are provided with a plurality of inwardly directed barbs which penetrate the cover layer of the end portion of a clamped hose and engage the reinforcing layer. In either case, a nut may be swaged around the formed B.S.P. nipple of the insert to allow attachment to a correspondingly formed union or the like.

FIGS. 5 to 7 show an insert formed in accordance with the invention being used in combination with a ferrule 40 the body 41 of which is similar to that described in our pending Patent application No. 48173/71. The end 42 of the ferrule nearest the formed nipple 43 on the insert differs from that shown in the aforementioned application in that the wall adjacent the end 42 is of reduced diameter to provide a cylindrical portion 45. The insert is pre-assembled with the ferrule before the end fitting is attached to a hose by swaging of cylindrical portion 45 into engagement with the insert between the rib 34 thereon and the nipple 43, as shown in FIG. 6. The ferrule is thus locked against axial movement and clamped against rotation with respect to the insert. The end portion of a hose to which the end fitting is to be attached is introduced into the annular space between the insert and the ferrule, and the ferrule swaged in the manner described in our said pending application.

It will be appreciated that in the arrangement shown in FIG. 7, the greater part of the axial force resulting from tension applied between the hose and the insert is carried by the barbs in the ferrule, and are then transferred to the insert by means of the swaged portion 45 engaging the rib 34.

We claim:

1. A method of manufacturing an improved insert for an end fitting from a length of tubular material which insert has a B.S.P. nipple or like nipple on the end thereof, an outwardly directed circumferential rib spaced along the insert from the nipple and an annular radial abutment surface where the nipple joins the remainder of the insert, which surface faces toward the rib, which method comprises (a) forming the rib at a location part way along the length of the tubular material by means of a first punch and die combination operable to form the rib while supporting the bore of the tubular material against collapse, (b) forming by means of second punch and die combination an enlargement at one end of the tubular material to form the radial abutment surface and to start forming the nipple and (c) engaging a third punch and die combination with said enlargement to finish form the nipple.

2. A method as claimed in claim 1 wherein the first punch and die combination form the rib by applying an axial force to one end of the tubular material to expand the wall of the tubular material into a recess in a die member surrounding the tubular material.

3. A method as claimed in claim 1 wherein the rib is used to hold the length of tubular material against axial movement during forming by the second and third punch and die combination.

* * * * *